Reissued Aug. 23, 1927. Re. 16,709

UNITED STATES PATENT OFFICE.

ANDREW M. FAIRLIE, OF ATLANTA, GEORGIA.

RECOVERY OF OXIDES OF NITROGEN IN SULPHURIC-ACID MANUFACTURE.

No Drawing. Original No. 1,420,477, dated June 20, 1922, Serial No. 382,519, filed May 19, 1920. Application for reissue filed August 24, 1926. Serial No. 131,305.

In the manufacture of sulphuric acid by the so-called chamber process, and also by some of the so-called tower processes, it is usual to treat gases containing sulphur dioxide and oxygen (or air) with oxides of nitrogen, this treatment being effected in the presence of moisture, the moisture being either in the form of steam or water vapor or in the form of a spray of liquid water or dilute acid containing water, or sometimes the water may be supplied in other ways. At the end of the acid-making apparatus a very large percentage of the nitrogen compounds introduced into the beginning of the acid making system exists in the gases in the form of oxides of nitrogen and these oxides can be referred to as the "higher oxides" and the "lower oxides" of nitrogen. The usual custom in the chamber process is to pass the gases leaving the last lead chamber through a tower commonly called a Gay-Lussac tower, in which the gases are treated with cool and moderately concentrated sulphuric acid, the concentration of the acid being such that it will absorb from the gases the major part at least of the oxides of nitrogen present in the gases. However, the absorption of nitrogen compounds in the Gay-Lussac tower as ordinarily operated, is not complete, and the gases leaving this tower may contain a substantial quantity of oxides of nitrogen.

In my previously issued Patent No. 1,205,723, describing an improvement in methods of manufacturing sulphuric acid, I stated that nitrogen oxides escaping from the last lead chamber of a sulphuric acid plant are most advantageously absorbed in the Gay-Lussac tower when a small percentage of sulphur dioxide (usually not less than .05% nor more than .15% by volume) is present in the gas mixture. Further experience of myself and others serves to confirm the truth of this statement.

In attempting to absorb in water the nitrogen oxides escaping absorption in the sulphuric acid in the Gay-Lussac tower, I discovered that these residual nitrogen oxides were not readily nor completely absorbed in water. I ascertained that this failure to be readily absorbed by water was due to the presence in the gas mixture of the small quantity of sulphur dioxide referred to above, which kept a substantial part of the residual nitrogen oxides reduced to the lower state of oxidation. If a Gay-Lussac tower be used for the absorption of the nitrogen oxides, the presence of the small percentage of sulphur dioxide referred to is highly desirable. If a water absorption of residual oxides of nitrogen is to follow the Gay-Lussac tower absorption, these traces of sulphur dioxide are highly undesirable during such water absorption.

In accordance with the present invention, I aim to remove the total quantity of sulphur dioxide from the gases, whereby the oxides of nitrogen can readily combine with oxygen of the air present (or with oxygen introduced into the gases, either as such or in the form of air) whereby higher oxides of nitrogen will be formed and subsequently I absorb, as completely as possible, these higher oxides of nitrogen. Ordinarily, the gases leaving the latter part of the acid-making plant will contain ample free oxygen for the complete oxidation of the $SO_2$ and lower oxides of nitrogen, but as stated, air or oxygen can be introduced, if needed.

Several different methods may be employed for the complete removal of the sulphur dioxide present in the gases, and for the purpose of illustration I give below four different methods by which such operation can be conveniently effected.

In the first modification, the gases from the Gay-Lussac tower of an acid plant, for example of the chamber type, are led through one or more towers in which the said gases are treated with lime, this preferably being hydrated lime, and either the dry hydrate or milk of lime or even lime water may be employed, but milk of lime is ordinarily to be preferred. Since the major part of the oxides of nitrogen present in the gases leaving the Gay-Lussac tower, are in the form of the lower oxides, milk of lime will not, under ordinary conditions, absorb or unite with any very considerable portion of these oxides, but the milk of lime will readily and substantially completely absorb the sulphur dioxide.

Air or oxygen may then be added to the gases, if the gases do not already contain a sufficient excess of free oxygen, and the gases may be conducted through suitable cooling and oxidizing apparatus, after which the gases are passed through suitable absorption apparatus in which they are treated with water, or (but not preferably) sulphuric acid or other absorbing medium. The passage of the gas through such latter absorption apparatus may conveniently be effected rather slowly in order to permit the lower oxides of nitrogen to become substantially completely oxidized to the higher oxides of nitrogen which latter are readily absorbable in water with the production of nitric acid. In order to prevent as much as possible, oxidation of the lower oxides of nitrogen to the higher oxides in the lime treating towers or absorbers, it is advisable to pass the gases through the lime apparatus at a rather rapid rate, since it is not desired to absorb any substantial quantities of the oxides of nitrogen by the lime.

In the second of the processes mentioned by way of example as illustrative of the present invention, I may pass the gases leaving the Gay-Lussac tower, with or without the addition of free oxygen (e. g., air) through an apparatus for the catalytic oxidation of $SO_2$ to $SO_3$. Preliminary to this operation the gases are preferably heated up considerably, which may be done in large part by a suitable interchanger, after which the gases are passed over or through a suitable catalyzer material, as in the contact process of making sulphuric acid, and thereafter the heat of the gases leaving the catalyzer is imparted to the cooler entering gases. The $SO_3$ formed in this operation may be suitably removed, for example by absorption in strong sulphuric acid, or by condensation after adding steam or water or liquid sulphuric acid. The gases may then be passed through appropriate apparatus for further cooling and oxidation, and are then passed into and through the nitrogen oxide absorbers, as above referred to.

The third modification of this invention is similar to the second, except that instead of completely oxidizing the sulphur dioxide by a catalytic process, the complete oxidation of the sulphur dioxide is effected by treatment with a chemical oxidizing agent, such as bromine, iodine, chlorine, bleaching powder, sodium or hydrogen peroxide, a permanganate, a ferric or other highly oxidized salt, or the like, in either solid, liquid or gaseous form, in appropriate apparatus, according to the nature of the oxidizing agent employed.

As a fourth form of execution of the present invention, the gases from the last lead chamber may be used without previous treatment in a Gay-Lussac tower. In this form of operation, the gases are passed from the last lead chamber into a chamber made of material resistant to nitric acid, such as acid-proof masonry made of acid-proof brick or tile laid in acid-proof cement. More or less air or oxygen-containing gases may (if desired) be admitted into the gases entering this masonry chamber. The size of the masonry chamber will vary considerably, from 1 to 25% of the total lead chamber space may be needed and in most cases between 5 and 15% of the total lead chamber space will be found to be a sufficient size for the masonry chamber. In this masonry chamber the entire amount of $SO_2$ present in the gases will be converted into sulphuric acid and substantially the entire quantity of lower oxides of nitrogen present in the gases will be converted into higher oxides of nitrogen, and the chamber should be large enough to allow the first mentioned of these results to be secured. It would not be expedient to convert the entire amount of $SO_2$ into sulphuric acid in ordinary lead chambers, since this would involve such an excess of the higher oxides of nitrogen in the gases, as would be liable to result in rapid destruction of the lead chamber. However, the masonry chamber above referred to being made of material which is resistant to both nitric and sulphuric acids, the excess of higher oxides of nitrogen in the gases can do no harm. The sulphuric acid formed may be condensed, or it may proceed as mist into the absorbing apparatus.

For a single masonry chamber, or other type of chamber, resistant to nitric acid, a series or group of such chambers may be substituted, for the complete oxidation of the sulphur dioxide and the lower oxides of nitrogen. Since the oxidation of the lower oxides of nitrogen goes on more rapidly if the gas mixture is cool, it is usually preferable to intermingle oxidation chambers with cooling devices or apparatus, whereby the gases may be cooled by means of flowing water (usually in indirect contact), or in some other manner. By this means the gas mixture, after complete oxidation of the sulphur dioxide, may be cooled to a temperature more favorable for the rapid oxidation of the lower oxides or nitrogen.

After leaving the oxidation apparatus, a further quantity of air of oxygen may be added to the gases if desired, after which the gases may travel to a suitable apparatus for the absorption of the higher oxides of nitrogen for example the water absorbers above referred to.

It will thus be seen that in the various modifications of my process forming the subject matter of the present application, I first treat the exit gases of any system in which sulphuric acid is manufactured by the employment of oxides of nitrogen, to remove from such gases as completely as possible, the sulphur dioxide present therein and I recover the sulphuric acid formed, and I allow and induce the conversion of the lower oxides of nitrogen present as completely as possible into the higher oxides of nitrogen, cooling the gases to facilitate this conversion, if desired, and I absorb the higher oxides of nitrogen, preferably in water to form nitric acid. The absorption of the higher oxides of nitrogen is preferably performed in acid-resisting masonry towers or other acid-resisting apparatus. A suitable tower for use in the process is that described in my co-pending application filed April 21, 1920.

In this latter operation, a high efficiency can be secured, since substantially all of the nitrogen is in the form of the higher oxides. If desired, the gases escaping from the water treatment may be subjected to a lime or alkaline treatment, to more completely recover the nitrogen oxides. In some instances it might be advisable, in place of employing apparatus in which the oxides of nitrogen are absorbed in water, to employ an ordinary Gay-Lussac tower fed with sulphuric acid of the strength adapted for absorption of the oxides of nitrogen, or some other suitable absorbing medium may be employed.

The nitric acid or nitrosulphuric acid, or other nitrogen compound, produced by the absorption of the oxides of nitrogen by any of the modifications of the methods herein described can be utilized, for example by feeding to the Glover tower or towers, or by otherwise introducing into the sulphuric acid-making system.

The invention herein described comprises, then, the following steps, as applied (A) to Gay-Lussac exit gases, and (B) to lead chamber exit gases:

1. Substantially complete elimination from the gas mixture of traces of sulphur dioxide, either by—

(*a*) Absorption in lime water or alkali.

(*b*) Oxidation by catalytic agent.

(*c*) Oxidation by chemical oxidizing agent.

(*d*) Oxidation by air or oxygen, as in modification 4.

2. Hydration of the sulphur trioxide and precipitation as sulphuric acid if desired.

3. Cooling the gas mixture, if desired.

4. Oxidation of lower oxides of nitrogen to higher oxides, with or without the addition of oxygen or air. (Steps 3 and 4 may be continued alternately as frequently as desired.)

5. Absorption of oxides of nitrogen, preferably in water.

6. Utilization of the recovered oxides of nitrogen by returning same to the sulphuric acid-making system. (This step may be omitted if desired, and the nitrogen compounds used or disposed of otherwise.)

The principal advantages which this invention offers over the prior art are:

1. A higher yield of sulphuric acid. The amount of sulphur dioxide escaping from the Gay-Lussac tower amounts to at least one per cent, and in many cases to two or three per cent, or more, of the total sulphur dioxide admitted to the Glover tower. All of this escaping sulphur dioxide is by several modifications of my method, recovered as liquid sulphuric acid.

2. A higher percentage of recovery of nitrogen oxides, resulting in a substantial economy in operating expenses for sulphuric acid manufacture.

3. Modification 4, in which the sulphuric acid-fed Gay-Lussac tower may be eliminated may also eliminate the disadvantages of circulating a large quantity of sulphuric acid over Gay-Lussac and Glover towers, which include:

(*a*) Impeded draft, due to sediment deposited by the circulating sulphuric acid in the interstices of the tower packing, resulting in waste of power for moving the gases, in impaired efficiency of the plugged Gay-Lussac tower as an absorber of nitrogen oxides, and in waste of sulphur dioxide.

(*b*) Waste of labor, water, sulphuric acid, and oxides of nitrogen, while washing sediment out of a plugged tower.

(*c*) Expense of cooling a large quantity of sulphuric acid (usually two or three times the daily capacity of the plant) for use on the Gay-Lussac tower.

(*d*) Loss of sulphuric acid as spray or mist in the exit gases from the Gay-Lussac tower.

I have referred above to washing gases containing higher oxides of nitrogen with water, say in towers or like devices. It will be obvious that when water (even pure water) is first brought in contact with gases containing higher oxides of nitrogen, the latter are (in part at least) absorbed by such water forming nitric acid, so that the actual washing liquid in said operations will be, when the same has traveled downwardly even a short distance in contact with such gases, a mixture of water containing more or less nitric acid. Hence where I refer to washing the gases with water, this obviously includes washing the gases with water containing more or less nitric acid, or in other words, a more or less dilute nitric acid.

I have above referred to treating (A) exit gases from a Gay-Lussac tower; or (B) exit gases from lead chambers or their technical equivalent. In the Gay-Lussac tower the gases are washed with cool sulphuric acid. These gases may thereafter be treated with water (aqueous liquid). Hence in this case there may be a succession of absorptions, i. e., first with acid in a Gay-Lussac tower, then with aqueous liquid. This latter step will form liquid containing nitric acid. Or, the exit gases from a Gay-Lussac tower may be treated with a chemical oxidizing agent for the removal or oxidation of the last traces of sulphur dioxide from said gases, and thereafter the said gases may be treated with water or aqueous liquid for the absorption of the higher oxides of nitrogen, the lower oxides of nitrogen being rapidly oxidized to higher oxides after the removal of the sulphur dioxide. In this case there may be a succession of steps as follows: first, absorption of nitrogen oxides in sulphuric acid in a Gay-Lussac tower; second, oxidation of residual sulphur dioxide by means of a chemical oxidizing agent; third, absorption of oxides of nitrogen in an aqueous liquid. Or, the exit gases from a Gay-Lussac tower may be treated with a chemical oxidizing agent, as aforesaid, for the complete removal of sulphur dioxide from the gases, and thereafter the said gases may be again treated with water or sulphuric acid for the absorption of higher oxides of nitrogen, as indicated above. In this latter case, the succession of steps would be: first, absorption of nitrogen oxides in a Gay-Lussac tower; second, oxidation of residual sulphur dioxide by means of a chemical oxidizing agent; third, absorption of oxides of nitrogen in water, or in sulphuric acid.

When the gases to be treated are gases discharged directly from the lead chambers, the sulphur dioxide in such gases may be oxidized by means of a chemical oxidizing agent, e. g., air and nitrogen oxides, in which operation some water also may be present, for the complete removal of the sulphur dioxide, and thereafter the nitrogen oxides may be absorbed in water, the succession of steps being: first, oxidation of sulphur dioxide by agency of an oxidized compound of nitrogen; second, absorption of nitrogen oxides in water. Or, after the oxidation of sulphur dioxide as aforesaid, the absorption of nitrogen oxides may take place in sulphuric acid as indicated above, the succession of steps being: first, complete removal of sulphur dioxide by means of an oxidized compound of nitrogen; second, absorption of oxides of nitrogen in sulphuric acid. Thus, there are several sequences of water and sulphuric acid described. Obviously, should any small amounts of sulphur dioxide be present in the gases at the time of treatment of the said gases with water containing nitric acid, the said acid would promptly oxidize the sulphur dioxide.

I have referred to the possibility of introducing air or oxygen, etc., into the gases after withdrawing from the last chamber or Gay-Lussac tower. Ordinarily the gases already will contain sufficient oxygen for the purpose.

I claim:—

1. A process of recovering the nitrogen oxides present in the exit gases discharged from a sulphuric acid manufacturing plant, which consists in first substantially completely removing the sulphur dioxide from such gases, thereafter oxidizing the oxides of nitrogen to the higher state of oxidation and absorbing the same.

2. A process of recovering the nitrogen oxides present in the exit gases of sulphuric acid manufacture which comprises substantially completely oxidizing the sulphur dioxide content thereof and the lower oxides of nitrogen, and absorbing the oxides of nitrogen in water.

3. A process of recovering the nitrogen oxides present in the gases leaving the last lead chamber (or its technical equivalent) of a sulphuric acid manufacturing plant employing a nitration process, which consists in passing such gases into a structure resistant to the action of nitric acid, allowing or causing therein the substantially complete oxidation of the sulphur dioxide, and allowing or causing the oxidation of the bulk of the lower oxides of nitrogen into the higher oxides to take place, and thereafter absorbing the latter.

4. The process of removing from the exit gases of a sulphuric acid manufacturing plant, the normal content of sulphur dioxide therein, oxidizing the lower oxides of nitrogen to higher oxides, and absorbing the latter.

5. A process of recovering the oxides of nitrogen present in the gases leaving a sulphuric acid-making apparatus employing oxides of nitrogen, which consist in substantially completely removing the sulphur dioxide from such gases, thereafter cooling the remaining gases containing the oxides of nitrogen while in contact with a substantial excess of free oxygen, whereby the lower oxides are oxidized to the higher oxides, and finally absorbing the latter.

6. A process of treating the gases leaving an apparatus for the manufacture of sulphuric acid involving the use of oxides of nitrogen, which comprises, first, substantially completely removing the sulphur dioxide from such gases by oxidizing and hydrating the same to produce an additional quantity of sulphuric acid, then oxidizing substantially the entire amount of the lower oxides of nitrogen present in the gases into the higher oxides, and finally absorbing the said higher oxides of nitrogen.

7. In the manufacture of sulphuric acid by the lead-chamber process, a process of recovering nitrogen oxides comprising the steps of first substantially completely removing the sulphur dioxide from the gases at a late stage of the sulphuric acid making process, oxidizing the lower oxides of nitrogen, and absorbing the higher oxides of nitrogen.

8. In the manufacture of sulphuric acid by the lead-chamber process, a process of recovering nitrogen oxides from the gas mixture discharged from the last chamber, which comprises first substantially completely removing the sulphur dioxide from the gas mixture after leaving the last chamber, then oxidizing the lower oxides of nitrogen, then absorbing the higher oxides of nitrogen a part at least of said absorbing being performed in an aqueous liquid.

9. The process of recovering oxides of nitrogen present in the exit gases of a lead chamber process sulphuric acid manufacturing plant, which comprises first substantially completely removing the sulphur dioxide present in such gases, then oxidizing the lower oxides of nitrogen present to higher oxides, then absorbing the higher oxides of nitrogen, and then returning the absorbed nitrogen-oxygen compounds to such sulphuric acid plant for use in the manufacture of sulphuric acid.

10. An improvement in the process of making sulphuric acid by methods involving the use of compounds containing nitrogen and oxygen, which comprises withdrawing from the latter part of the plant in which such process is conducted, gases containing not more than a small percentage of $SO_2$, substantially completely oxidizing any $SO_2$ in said gases and thereafter oxidizing lower oxides of nitrogen in said gases and thereafter absorbing the higher oxides of nitrogen from said gases by contact with a liquid, and introducing liquid carrying such absorbed oxides of nitrogen into a Glover tower used in a sulphuric acid producing operation.

11. An improvement in the process of making sulphuric acid by methods involving the use of compounds containing nitrogen and oxygen, which comprises withdrawing from the latter part of the plant in which such process is conducted, gases containing a small percentage only of $SO_2$, substantially completely oxidizing such $SO_2$ and thereafter oxidizing lower oxides of nitrogen in said gases and thereafter absorbing the higher oxides of nitrogen from said gases by contact with an aqueous liquid, and introducing liquid carrying such absorbed oxides of nitrogen into the Glover tower of the acid-making plant.

12. A process of recovering the nitrogen oxides present in the exit gases discharged from the sulphuric acid manufacturing plant, which consists in first substantially completely removing the sulphur dioxide from such gases, thereafter oxidizing the oxides of nitrogen to a higher state of oxidation and absorbing the same, and introducing resultant product of said absorption step, into the Glover tower.

13. A process of recovering the nitrogen oxides present in the exit gases containing some $SO_2$ discharged from a sulphuric acid manufacturing plant, which consists in first substantially completely removing the sulphur dioxide from such gases, thereafter oxidizing the oxides of nitrogen to the higher state of oxidation and absorbing the same in liquids, including a liquid consisting largely at least, of water as one of the absorbents, to form nitric acid, and introducing the nitric acid so formed into the Glover tower.

14. A process of recovering the nitrogen oxides present in the exit gases of sulphuric acid manufacture which comprises substantially completely oxidizing the sulphur dioxide content thereof and the lower oxides of nitrogen, and absorbing the oxides of nitrogen in water to form nitric acid, and introducing such nitric acid into a Glover tower of a sulphuric acid plant.

15. A process of recovering the nitrogen oxides present in the gases leaving the last lead chamber (or its technical equivalent) of a sulphuric acid manufacturing plant employing a nitration process, which consists in passing such gases into a structure resistant to the action of nitric acid, allowing or causing therein the substantially complete oxidation of the sulphur dioxide, and allowing or causing the oxidation of the bulk of the lower oxides of nitrogen into the higher oxides to take place, and thereafter absorbing the latter in an aqueous liquid to form an acid liquid containing nitric acid and introducing same into a Glover tower.

16. A process of recovering the nitrogen oxides present in the gases leaving the last lead chamber (or its technical equivalent) of a sulphuric acid manufacturing plant employing oxygen compounds of nitrogen, which consists in passing such gases into a structure resistant to the action of nitric acid, allowing or causing the substantially complete oxidation of any sulphur dioxide contained in said gases, and allowing or causing therein the oxidation of the bulk of the lower oxides of nitrogen into the higher oxides to take place, and thereafter absorbing the latter in a succession of liquid treatments and introducing the liquid product containing such absorbed nitrogen oxides into a Glover tower.

17. The process of removing from the exit gases of a sulphuric acid manufacturing plant, the normal content of sulphur dioxide therein, oxidizing the lower oxides of nitrogen to higher oxides, and absorbing the latter in a series of liquid absorbing agents, one of said liquids being essentially water, and feeding the liquid resulting from such water treatment into a Glover tower.

18. A process of recovering the oxides of nitrogen present in the gases leaving a sulphuric acid-making apparatus employing oxides of nitrogen, which consists in substantially completely removing the sulphur dioxide from such gases, thereafter cooling the remaining gases containing the oxides of nitrogen while in contact with a substantial excess of free oxygen, whereby the lower oxides are oxidized to the higher oxides, and finally absorbing the latter in liquids, one at least of which consists essentially of water to form nitric acid, and introducing the said nitric acid into contact with the hot gases containing $SO_2$, at an early stage of the sulphuric acid making process.

19. A process of treating the gases leaving an apparatus for the manufacture of sulphuric acid involving the use of oxides of nitrogen, which comprises, first, substantially completely removing the sulphur dioxide from such gases by oxidizing and hydrating the same to produce an additional quantity of sulphuric acid, then oxidizing substantially the entire amount of the lower oxides of nitrogen present in the gases into the higher oxides, and finally absorbing the said higher oxides of nitrogen and contacting the absorbent carrying the so-absorbed oxides of nitrogen with the hot gases containing $SO_2$ in an early stage of the acid making process.

20. A process of treating the gases leaving an apparatus for the manufacture of sulphuric acid involving the use of oxides of nitrogen, which comprises, first, substantially completely removing the sulphur dioxide from such gases by oxidizing and hydrating the same to produce an additional quantity of sulphuric acid, then oxidizing substantially the entire amount of the lower oxides of nitrogen present in the gases into the higher oxides, and finally absorbing the said higher oxides of nitrogen and contacting the absorbent carrying the so-absorbed oxides of nitrogen with hot gases containing $SO_2$ in a Glover tower.

21. A process which comprises subjecting the exit gases discharged from a sulphuric acid making plant to treatment with a chemical oxidizing agent to oxidize any residual sulphur dioxide therein, and thereafter oxidizing the low oxide of nitrogen therein into a higher state of oxidation, and absorbing such higher oxide of nitrogen from said gases and introducing the resulting liquid into a Glover tower.

22. In the manufacture of sulphuric acid by the use of nitrogen-oxygen compounds, the herein described process which comprises passing gases from the latter part of the sulphuric acid making system, while in contact with some free oxygen, into contact with water, until such water contains a substantial percentage of nitric acid, and thereafter introducing such nitric acid into the Glover tower of a sulphuric acid making plant, whereby its content of nitrogen-oxygen compounds is reintroduced into the sulphuric acid making system.

23. In the manufacture of sulphuric acid by a method involving the use of compounds containing nitrogen and oxygen, the herein described steps of withdrawing the exit gases from a part of a sulphuric acid making plant near the rear end thereof, into a structure of which a part at least is resistant to action of nitric acid, maintaining therein conditions favorable to oxidation of constituents thereof, and continuing such conditions until a large part at least of the lower oxides of nitrogen have been oxidized to higher oxides of nitrogen, and subjecting such gases to the action of a liquid absorbent capable of absorbing higher oxides of nitrogen, and thereafter introducing such liquid into a Glover tower of a sulphuric acid making plant.

24. In the manufacture of sulphuric acid by a method involving the use of compounds containing nitrogen and oxygen, the herein described steps of withdrawing the exit gases from a part of a sulphuric acid making plant near the rear end thereof, into a structure of which a part at least is resistant to action of nitric acid, maintaining therein conditions favorable to oxidation of constituents thereof, and continuing such conditions until a large part at least of the lower oxides of nitrogen have been oxidized to higher oxides of nitrogen, and subjecting such gases to the action of an aqueous liquid to absorb higher oxides of nitrogen, and thereafter introducing such liquid into a Glover tower of a sulphuric acid making plant.

25. A process of recovering the nitrogen oxides present in the gases leaving the last lead chamber (or its technical equivalent) of a sulphuric acid manufacturing plant employing a nitration process, which consists in passing such gases into a structure resistant to the action of nitric acid, allowing or causing therein the substantially complete oxidation of any sulphur dioxide contained therein, and allowing or causing the oxidation of the bulk of the lower oxides of nitrogen into the higher oxides to take place, and thereafter absorbing the latter in an absorbent liquid and introducing the product containing such absorbed nitrogen oxides into a Glover tower.

26. In a process of manufacturing sulphuric acid by means of a nitrogen-oxygen compound, the process of recovering the nitrogen oxides present in the chamber gas mixture which comprises substantially completely oxidizing the sulphur dioxide contained in the gases of the rear part of the sulphuric acid making part of the acid plant, and also oxidizing lower oxides of nitrogen in said gases to higher oxides, and absorbing the latter, and introducing the liquid containing the absorbed oxides of nitrogen into the Glover tower.

27. In the chamber process for the manufacture of sulphuric acid, the process of recovering oxides of nitrogen from the gas mixture leaving the lead chambers, which comprises continuously permitting the substantially complete oxidation of $SO_2$ in the gases, cooling the remaining gases, oxidizing the lower oxides of nitrogen to higher oxides, and absorbing at least part of the latter in a liquid initially consisting essentially of water for the production of nitric acid, and passing the nitric acid so produced to a Glover tower for use in the production of sulphuric acid.

28. In the chamber process for the manufacture of sulphuric acid, the process of recovering nitrogen oxides from a gas mixture containing the same but containing no $SO_2$ and coming from a sulphuric acid making process, which comprises allowing and inducing the conversion of lower oxides of nitrogen to higher oxides of nitrogen, cooling the gas mixture, and absorbing at least part of the higher oxides of nitrogen in water to form nitric acid and feeding the liquid containing such nitric acid to a Glover tower.

29. In the chamber process for the manufacture of sulphuric acid, the process of recovering nitrogen oxides from a gas mixture containing the same, leaving the sulphuric acid making part of a sulphuric acid plant, comprising first treating such gas mixture to oxidize substantially completely the $SO_2$ present therein, thereby producing an additional quantity of sulphuric acid, and allowing and inducing the conversion of lower oxides of nitrogen to higher oxides, and absorbing at least part of the higher oxides of nitrogen in a liquid adapted for the absorption of higher oxides of nitrogen.

30. In the manufacture of sulphuric acid by the chamber process the process of recovering nitrogen oxides which comprises first substantially completely removing any sulphur dioxide mixed therewith, allowing and inducing the oxidation of lower oxides of nitrogen to higher oxides of nitrogen, and thereafter absorbing at least part of the higher oxides in a liquid.

31. In the manufacture of sulphuric acid by the use of oxides of nitrogen, the herein described process which comprises cooling the gases after leaving the latter part of a sulphuric acid-making plant and passing said gases into contact with water, until such water contains a substantial percentage of nitric acid, and thereafter introducing such nitric acid into the Glover tower of a sulphuric acid plant.

32. In the manufacture of sulphuric acid by the chamber process, the process of recovering nitrogen oxides from the gas mixture containing the same and also some free oxygen, such gases coming from the rear part of a sulphuric acid-making apparatus, comprising the steps of cooling such gas mixture, permitting oxidation of lower oxides of nitrogen contained therein into higher oxides of nitrogen, contacting such gas mixture with an aqueous liquid to produce a liquid nitric acid, and introducing such liquid containing nitric acid into a Glover tower.

33. In the process of manufacturing sulphuric acid by means of a nitrogen-oxygen compound, the process of recovering the nitrogen oxides in the gas mixture discharged from the last lead chamber or its technical equivalent, which comprises cooling such gas mixture and treating such gas mixture with a chemical oxidizing agent and with an absorbent liquid for oxides of nitrogen.

ANDREW M. FAIRLIE.